US007920256B2

(12) United States Patent
Lee et al.

(10) Patent No.: US 7,920,256 B2
(45) Date of Patent: Apr. 5, 2011

(54) PRINTING MEDIUM DETECTING DEVICE, IMAGE FORMING APPARATUS HAVING THE SAME, AND METHOD TO DETECT PRINTING MEDIUM

(75) Inventors: Ho-il Lee, Suwon-si (KR); Jong-kyu Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 787 days.

(21) Appl. No.: 11/781,566

(22) Filed: Jul. 23, 2007

(65) Prior Publication Data

US 2008/0130006 A1 Jun. 5, 2008

(30) Foreign Application Priority Data

Dec. 4, 2006 (KR) ........................ 10-2006-0121568
Feb. 27, 2007 (KR) ........................ 10-2007-0019558

(51) Int. Cl.
*G01J 1/42* (2006.01)

(52) U.S. Cl. ........ 356/218; 356/624; 356/213; 356/448; 399/16; 399/30

(58) Field of Classification Search .......... 356/614–624, 356/445–448, 213, 218–219; 399/16–30
See application file for complete search history.

(56) References Cited

U.S. PATENT DOCUMENTS 4,912,317 A * 3/1990 Mohan et al. .............. 250/222.2
6,824,128 B2 * 11/2004 Nagata et al. ................. 399/124
7,374,163 B2 * 5/2008 Cook et al. .................... 271/145

* cited by examiner

*Primary Examiner* — Gregory J Toatley
*Assistant Examiner* — Iyabo S Alli
(74) *Attorney, Agent, or Firm* — Staas & Halsey LLP

(57) ABSTRACT

A printing medium detecting device capable of accurately detecting an amount of printing media in a paper cassette, an image forming apparatus including the printing medium detecting device, and a method to detect a printing medium. The printing medium detecting device of the image forming apparatus includes a light source to emit a light beam to one side of a stack of printing media housed in a paper cassette, a scanning unit to scan the light beam reflected from the stack and generate a signal based on the light beam, and a computing unit to compute information related to the stack based on the signal, wherein the information includes a number of printing media sheets in the stack.

26 Claims, 6 Drawing Sheets

PRINTING MEDIUM DETECTING DEVICE, IMAGE FORMING APPARATUS HAVING THE SAME, AND METHOD TO DETECT PRINTING MEDIUM

CROSS-REFERENCE TO RELATED APPLICATIONS

This application claims the benefit of Korean Application No. 2006-121568, filed on Dec. 4, 2006, and Korean Patent Application No. 2007-19558, filed on Feb. 27, 2007, in the Korean Intellectual Property Office, the disclosure of which is incorporated herein by reference.

BACKGROUND OF THE INVENTION

1. Field of the Invention

Aspects of the present invention relate to a printing medium detecting device, an image forming apparatus having the printing medium detecting device, and a method to detect a printing medium.

2. Description of the Related Art

An image forming apparatus, such as a copier, a printer, a facsimile, and a multi-functional device, includes an image forming unit to form an image on a printing medium supplied from a paper cassette, and a printing medium detecting device to detect an amount of printing media remaining in the paper cassette. FIGS. 1A and 1B show examples of a printing medium detecting device 1 of an image forming apparatus.

As shown in FIGS. 1A and 1B, a printing medium detecting device 1 of a general image forming apparatus includes a knock up plate 2*a* to support printing media P housed in a paper cassette 2, and a display lever 3 to rotate about a hinge axle 3*a*.

According to the construction illustrated in FIGS. 1A and 1B, the display lever 3 rotates about the hinge axle 3*a* while linking to the knock up plate 2*a* which moves in a vertical direction according to the weight of the stacked printing media P. Accordingly, a user may check a number of sheets of the printing media P remaining in the paper cassette 2 by observing a location of the display lever 3.

However, in this printing medium detecting device 1, the user checks the display lever 3 directly with his or her naked eye. Furthermore, when multiple users are using a single image forming apparatus, such as a network printer, multiple image forming signals may be simultaneously input. Accordingly, in this situation, it is not easy to predict whether the amount of printing media P stacked in the paper cassette 2 will be sufficient when several image forming operations are simultaneously performed.

In other words, in situations where multiple image forming operations are performed and the printing media P housed in the paper cassette 2 is not sufficient to perform each of the image forming operations, users do not know whether the number of sheets of the printing media P is sufficient to perform each of the image forming operations until after the image forming commands have been input.

Therefore, problems arise, including that the operation time required for the image forming operations becomes longer if the printing media P becomes depleted in the middle of the printing operations, resulting in a decrease in the operation efficiency.

SUMMARY OF THE INVENTION

Aspects of the present invention relate to a printing medium detecting device, an image forming apparatus having the printing medium detecting device, and a method to detect a printing medium, which can accurately inform a user of the amount of printing media available in the image forming apparatus.

According to an aspect of the present invention, a printing medium detecting device of an image forming apparatus includes a light source to emit a light beam to one side of a stack of printing media housed in a paper cassette, a scanning unit to scan the light beam reflected from the stack and generate a signal based on the light beam, and a computing unit to compute information related to the stack based on the signal, wherein the information includes a number of printing media sheets in the stack.

According to an aspect, the printing medium detecting device further includes an indicating unit to transmit the information based on a result of the computation.

According to an aspect, the computing unit computes the number of printing media sheets in the stack by determining a difference in a brightness of the light beam scanned by the scanning unit.

According to an aspect, the computing unit computes the information based on the difference in the brightness of the signal in a perpendicular direction to a direction in which the sheets of the printing media are stacked.

According to an aspect, the computing unit sets an effective section between two points of the signal, which are placed between a highest brightness indicating a brightest region and a lowest brightness indicating a darkest region, to compute the information.

According to an aspect, the computing unit further includes a pulse generator to generate ON and OFF pulse signals according to the brightness in the effective section.

According to an aspect, the pulse generator generates one of the ON pulse signals at each relatively bright point corresponding to each of the brightnesses crossing a top of the effective section, and generates one of the OFF pulse signals at each relatively dark point corresponding to each of the brightnesses crossing a bottom of the effective section.

According to an aspect, the computing unit computes the information according to a number of the ON pulse signals generated by the pulse generator.

According to an aspect, one of the two points is 80% above the lowest brightness and the other of the two points is 50% above the lowest brightness so that the effective section occupies approximately 50% to 80% above the lowest brightness.

According to an aspect, the indicating unit transmits the information if an image forming signal is input to the image forming apparatus.

According to an aspect, the light source and the scanning unit are mounted outside of the paper cassette, and the light beam is emitted to and reflected from the stack of printing media through a guide hole in the paper cassette.

According to an aspect, the light source and the scanning unit are disposed within the paper cassette.

According to an aspect, the indicating unit calculates a number of sheets required to perform each of a plurality of image forming operations inputted by a plurality of users through a network and transmits the information to each of the plurality of users according to whether the number of sheets in the stack of printing media is sufficient to perform all of the image forming operations.

According to another aspect of the prevent invention, an image forming apparatus includes a main body in which an image forming unit is mounted, a paper cassette which is attachable and detachable to and from the main body and holds a stack of printing media, and a printing medium detecting device. The printing medium detecting device includes a light source to emit a light beam to one side of the stack, a scanning unit to scan the light beam reflected from the stack and generate a signal based on the light beam, and a computing unit to compute information related to the stack based on the signal, wherein the information includes a number of printing media sheets in the stack.

According to another aspect, the computing unit computes the information based on a difference in a brightness of the signal in a perpendicular direction to a direction in which the sheets of the printing media are stacked.

According to another aspect, the computing unit sets an effective section between two points in the signal, which are placed between a highest brightness indicating a brightest region and a lowest brightness indicating a darkest region, to compute the information.

According to another aspect, the computing unit further includes a pulse generator to generate an ON pulse signal at each relatively bright point corresponding to each of the brightnesses crossing a top of the effective section, and generate an OFF pulse signal at each relatively dark point corresponding to each of the brightnesses crossing a bottom of the effective section.

According to another aspect, one of the two points is 80% above the lowest brightness and the other of the two points is 50% above the lowest brightness so that the effective section occupies approximately 50% to 80% above the lowest brightness.

The image forming apparatus further includes an indicating unit to transmit the information to a user if an image forming signal is input to the image forming apparatus.

According to another aspect, the indicating unit calculates a number of sheets required to perform each of a plurality of image forming operations inputted by a plurality of users through a network and transmits the information to each of the plurality of users according to whether a number of printing media sheets in the stack is sufficient to perform all of the image forming operations.

According to another aspect of the prevent invention, a method to detect printing media in an image forming apparatus includes emitting a light beam to one side of a stack of printing media housed in a paper cassette; scanning the light beam reflected from the printing media to obtain a signal; and computing information related to the stack based on the signal obtained by the scanning, wherein the information includes a number of printing media sheets in the stack.

According to another aspect, the computing includes measuring brightness from the signal; setting an effective section between two points in the signal, which are placed between a highest brightness indicating a brightest region and a lowest brightness indicating a darkest region; generating ON and OFF pulse signals according to the brightness in the effective section; and computing the information based on the generated pulse signals.

According to another aspect, the generating includes generating one of the ON pulse signals at each relatively bright point corresponding to one of the brightnesses crossing a top of the effective section, and generating one of the OFF pulse signals at each relatively dark point corresponding to one of the brightnesses crossing a bottom of the effective section.

According to another aspect, the computing includes computing the information according to a number of the generated ON pulse signals.

According to another aspect, one of the two points is 80% above the lowest brightness and the other of the two points is 50% above the lowest brightness so that the effective section occupies approximately 50% to 80% above the lowest brightness.

The method further includes transmitting the computed information to a user if an image forming signal is input.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
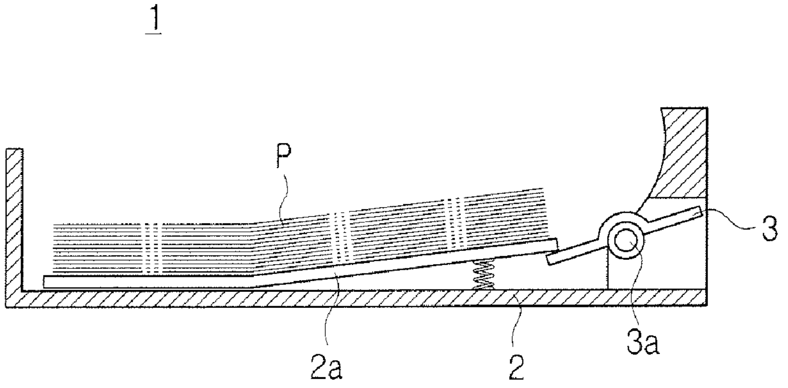
FIG. 1A (PRIOR ART)
FIGS. 1A and 1B are schematic section views of a printing medium detecting device of a general image forming apparatus.
Figure 1B:
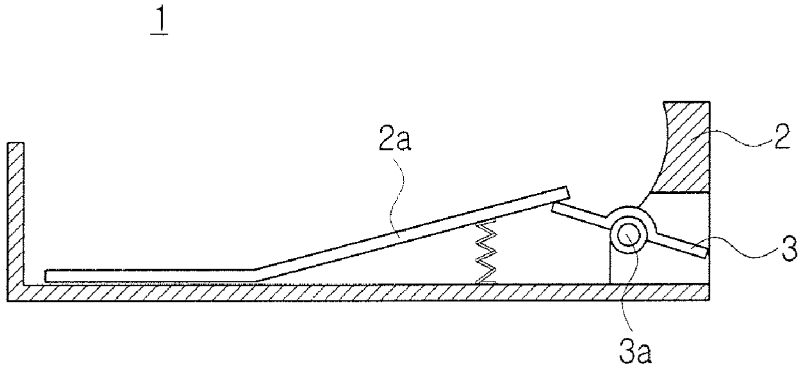
FIG. 1B (PRIOR ART)

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a printing medium detecting device, an image forming apparatus including the printing medium detecting device, and a method to detect a printing medium will be described with reference to the accompanying drawings.

Figure 2:
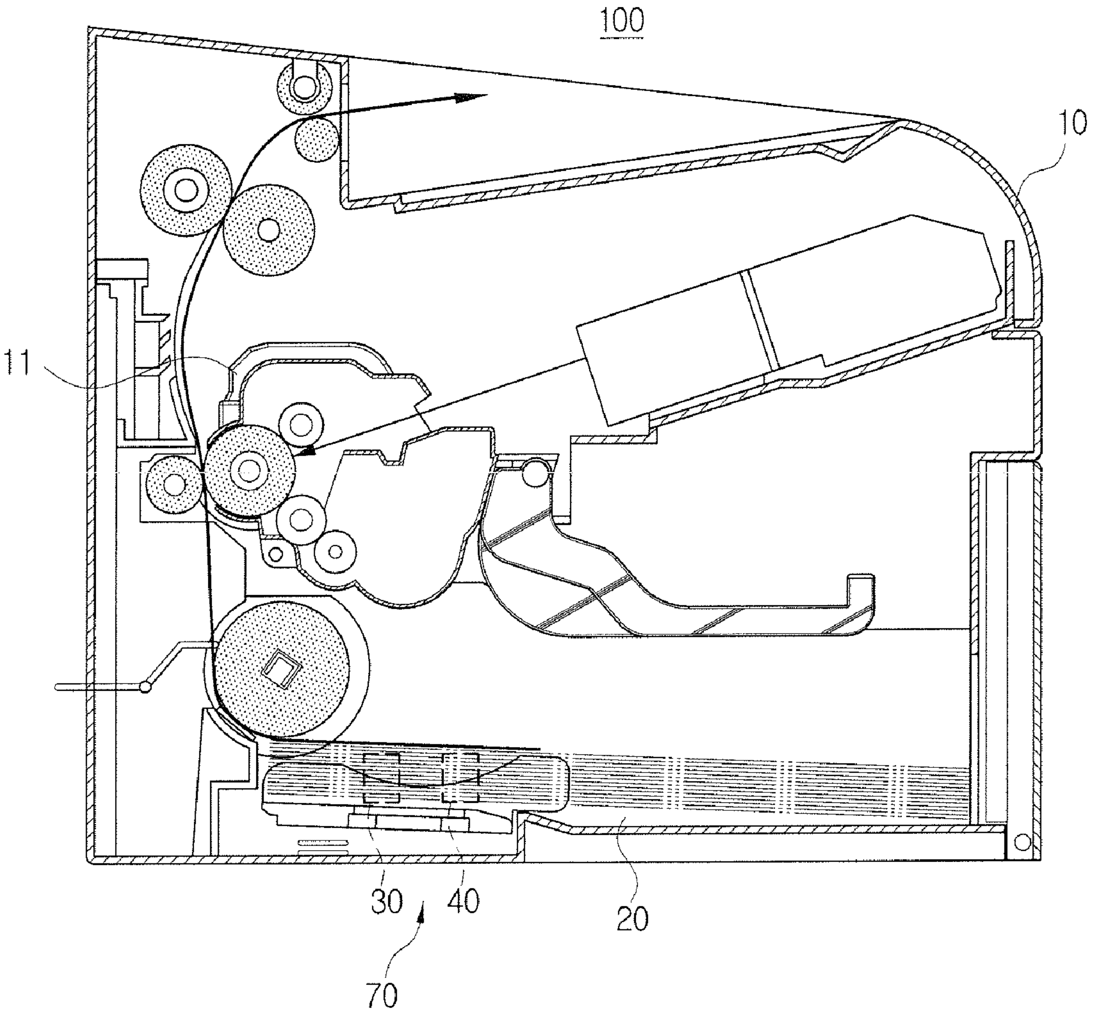
FIG. 2 is a schematic view of an image forming apparatus including a printing medium detecting device according to an embodiment of the present invention.

Referring to FIG. 2, an image forming apparatus 100 according to an embodiment of the present invention includes a main body 10 including an image forming unit 11, a paper cassette 20 which is attachable and detachable to and from the main body 10 and holds a stack of printing media P, and a printing medium detecting device 70 to detect a number of sheets of the printing media P remaining in the paper cassette 20. The printing media P may be various types, such as paper, transparency sheets, etc. The image forming unit 11 and paper cassette 20 are known to those skilled in the art, so a more detailed description and drawings thereof are omitted. Furthermore, it is understood that the paper cassette 20 is not limited to housing sheets of paper, and may instead house various type of printing media P, such as transparency sheets, etc.

Figure 3:
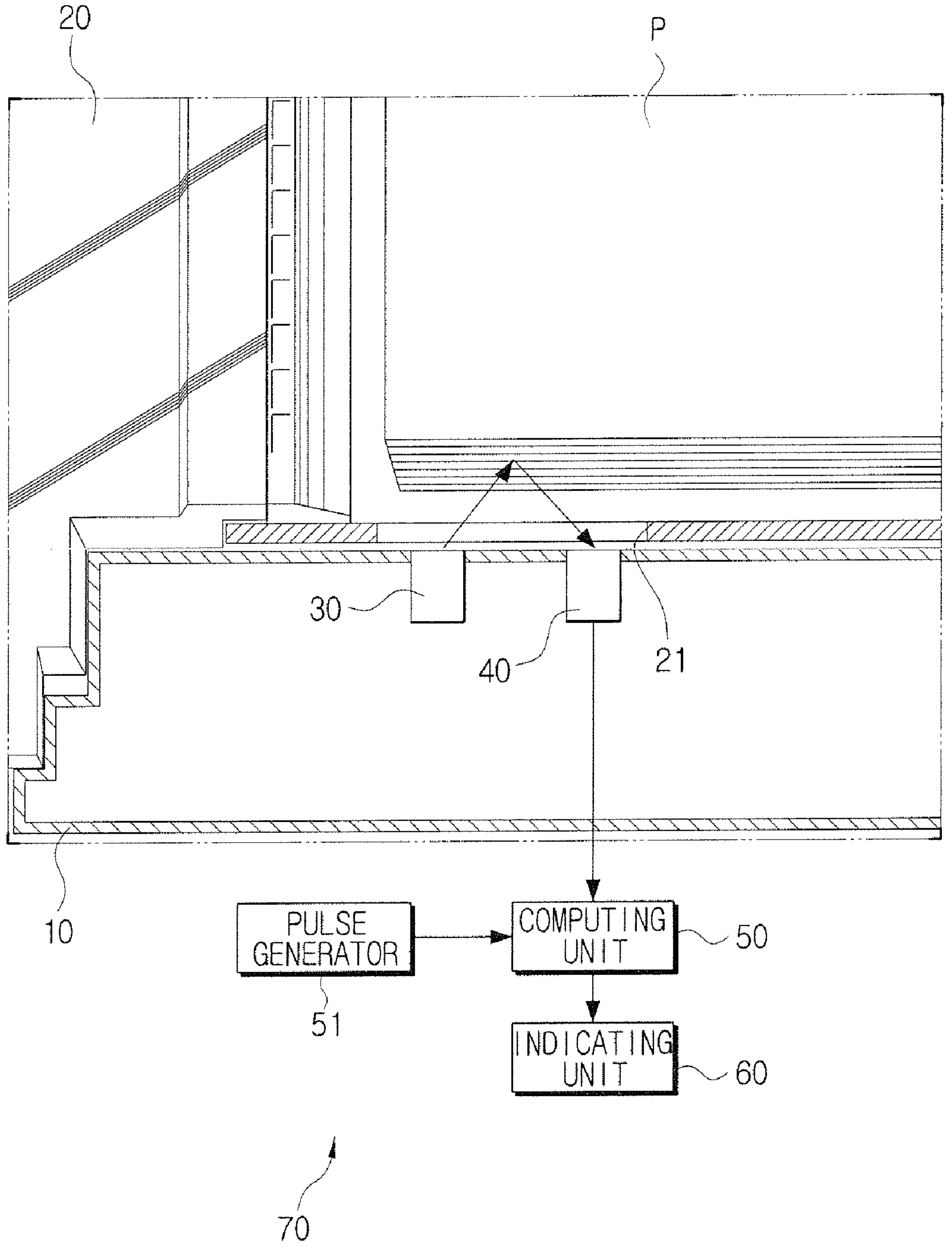
FIG. 3 is a schematic view of the printing medium detecting device of FIG. 2.
Figure 4:
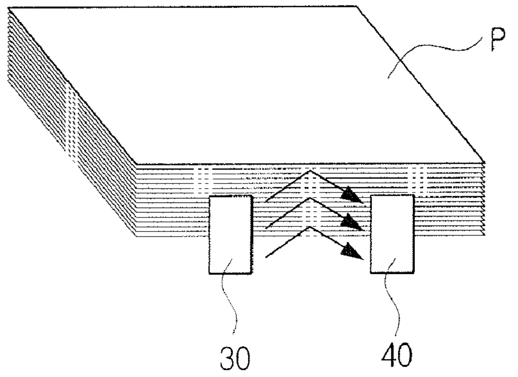
FIG. 4 is a schematic view of a state in which the printing media are detected by a light source unit and a scanning unit shown in FIG. 3.
Figure 5A:
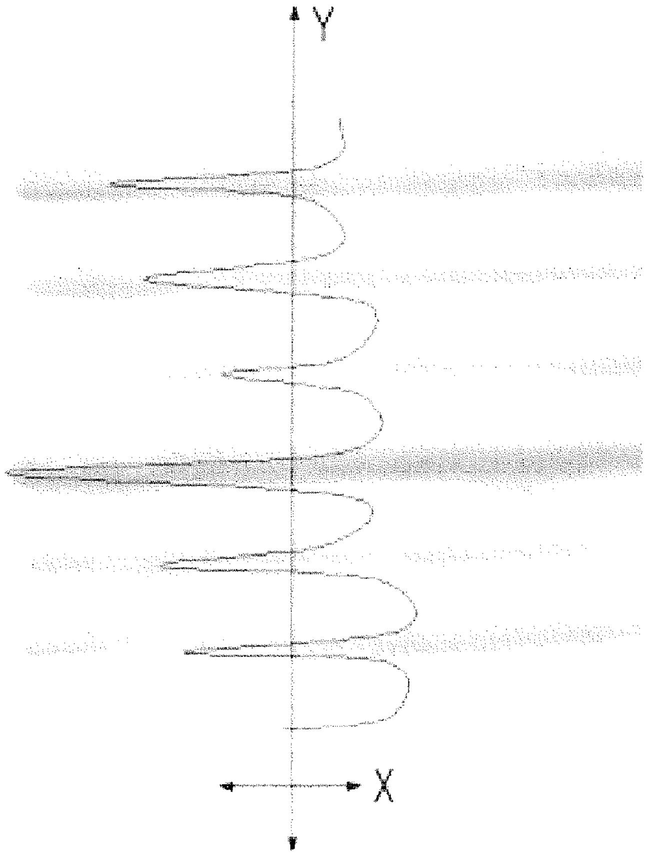
FIG. 5A is an enlarged view of a signal generated by a scanning unit shown in FIG. 3.

As shown in FIGS. 3 and 4, the printing medium detecting device 70 includes a light source 30, a scanning unit 40, a computing unit 50, and an indicating unit 60. The light source 30 emits a light beam to the printing media P housed in the paper cassette 20 in which a number of sheets of the printing media P are stacked. As shown in FIG. 4, the light source 30 is mounted so that the light beam can be emitted to one side of the stack of the printing media P. Specifically, the light source 30 emits the light beam in a direction in which the sheets of printing media P are housed in the paper cassette 20, that is, in the grain direction X of the printing medium P, as shown in FIG. 5A. The light source 30 employs at least one of various light generating components to generate the light beam, including, for example, a conventional light bulb or a laser. It is understood that the light source 30 is not limited to emitting the light beam in the grain direction X, and may instead emit the light beam in other directions, such as the stacking direction Y shown in FIG. 5A.

Figure 5B:
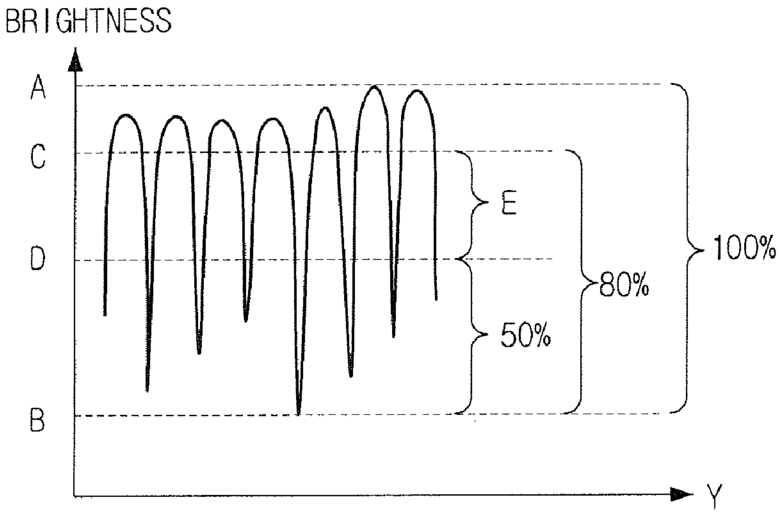
FIG. 5B is a schematic graph of a difference in the brightness of the signal shown in FIG. 5A.

The scanning unit 40 scans the light beam emitted to the printing media P from the light source 30. A scanning signal scanned by the scanning unit 40 is shown in FIGS. 5A and 5B. The scanning unit 40 scans the printing media P in the grain direction X of the printing media P to determine the brightness between the printing media P The light source 30 and scanning unit 40 constructed as described above are mounted in the main body 10 of the image forming apparatus 100 in order to easily exchange signals with the main body 10, as shown in FIGS. 2 and 3. According to an aspect of the present invention, a guide hole 21 is formed at one side of the paper cassette 20 for the light beam to pass through. However, other aspects of the present invention are not necessarily limited to the configuration shown in FIG. 3. For example, the light source 30 and the scanning unit 40 may be mounted in the paper cassette 20 so that the signals can be exchanged with the main body 10 without using the guide hole 21.

The computing unit 50 computes the number of sheets of the printing media P remaining in the paper cassette 20 based on the difference in the brightness of the scanned signal generated by the scanning unit 40. As shown in FIG. 5A, the computing unit 50 computes the difference in the brightness of the scanned signal in a perpendicular direction Y to the grain direction X. The perpendicular direction Y is the direction in which the sheets of the printing media P are stacked.

Specifically, the computing unit 50 uses relatively bright regions located between dark regions to compute the number of sheets of the printing media P. A relatively dark region indicates a region located between sheets of the printing media P, and a relatively bright region indicates a printing medium P, as illustrated by the brightness of the scanned signal shown in FIGS. 5A and 5B.

Figure 5C:
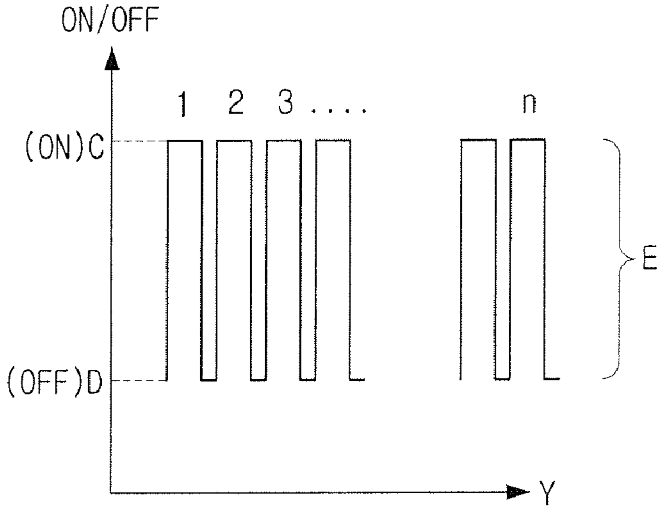
FIG. 5C is a schematic graph of a state in which ON/OFF pulse signals are generated in an effective section of FIG. 5B.

The computing unit 50 sets an effective section E between two points C and D of the scanned signal, which are placed between the highest brightness A indicating the brightest region and the lowest brightness B indicating the darkest region, and then computes the number of sheets of the printing media P. Accordingly, the signals can be exchanged between the computing unit 50 and a pulse generator 51 which generates ON/OFF pulse signals based on brightness measurements in relation to the effective section E. Specifically, as shown in FIG. 5C, the pulse generator 51 generates one of the ON pulse signals at each brightness crossing the relatively bright point C at the top of the effective section E, and generates one of the OFF pulse signals at each brightness crossing the relatively dark point D at the bottom of the effective section E.

The computing unit 50 computes the number of ON pulse signals generated by the pulse generator 51 to obtain the number of sheets of the printing media P. In other words, the number of ON pulse signals corresponds to the number of sheets of the printing media P housed in the paper cassette 20. However, other aspects of the present invention are not necessarily limited thereto. Accordingly, the number of sheets of the printing media P may instead be obtained from the number of OFF pulse signals or from a combination of ON/OFF pulse signals. Additionally, it is understood that the computing unit 50 may calculate the number of sheets of the printing media P in other ways. For example, if the scanning unit 40 calculates a distance between a bottom sheet and a top sheet in the stack by using detected brightness, the number of individual sheets in the printing media P can be calculated by dividing this measured distance by an average thickness of each sheet.

In an embodiment of the present invention, as shown in FIG. 5B, the effective section E is a section which occupies the area approximately 80% (point C) to 50% (point D) above the lowest brightness B toward the highest brightness A. However, other aspects of the present invention are not necessarily limited thereto, and the effective section E may be any section between the highest brightness A and the lowest brightness B.

The indicating unit 60 transmits information related to the number of sheets of the printing media P based on the result of the computation performed by the computing unit 50 to a user. At this time, if the user inputs an image forming signal, the indicating unit 60 informs the user of the obtained printing media information. Specifically, if one user from among a plurality of users using a single image forming apparatus through a network inputs an image forming signal, the indicating unit 60 compares the number of sheets to be printed corresponding to all of the input image forming signals to the number of sheets of the printing media P. Then, the indicating unit 60 transmits the comparison result to the user or users through a device, such as a personal computer (PC) of the user or users which is connected to the image forming apparatus 100 on the network. Accordingly, the user or users can accurately check the number of sheets of the printing media P prior to inputting a command to perform the image forming operation, enabling the user or users to refill the printing media P in the paper cassette 20 prior to the image forming operation, if necessary, thereby improving operational efficiency. The indicating unit 60 may be, for example, a computer program embodied on a computer-readable medium, such as a hard disc of a PC, or a device that includes such a computer program.

Aspects of the present invention are not necessarily limited to the indicating unit 60 transmitting the printing media information in response to the user inputting the image forming signal. Instead, the indicating unit 60 can transmit at least one of various informing signals, such as a visual signal displayed in a display panel or an audio signal played through an audio unit, such as speakers, in order to inform the user of the number of sheets of the printing media P available for printing, regardless of whether the user has input the image forming signal. Additionally, it is understood that the computing unit 50 is not limited to computing a number of sheets of the printing media P, and may also compute other characteristics of the stack of printing media P, such as a length and/or height of the stack.

A method to detect information about a number of sheets of printing media P in the image forming apparatus 100 as constructed above, according to an embodiment of the present invention, will be described with reference to FIGS. 3, 4, 5, 6 and 7.

Figure 6:
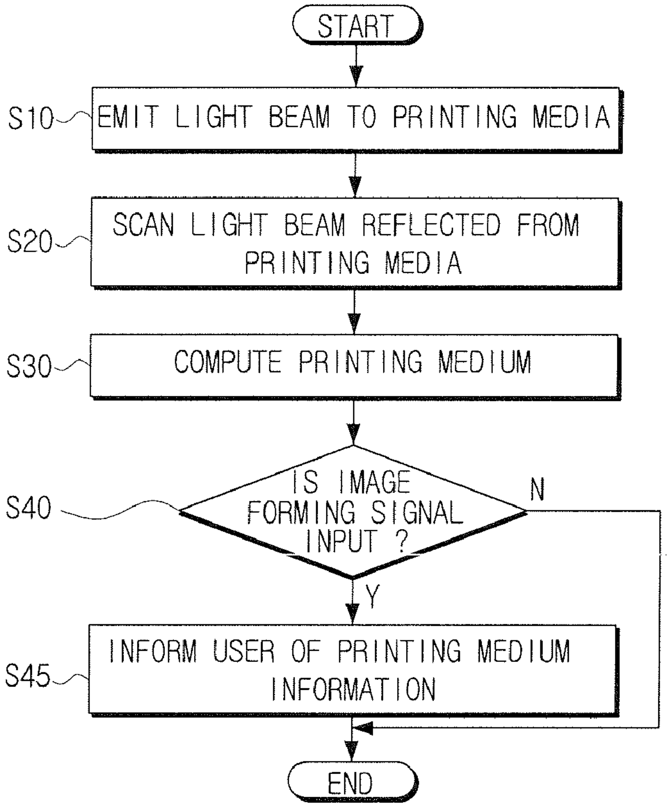
FIG. 6 is a flowchart schematically illustrating a method to detect a printing medium according to an embodiment of the present invention.

Referring to FIGS. 3, 4, and 6, the light source 30 emits a light beam to one side of a stack of the printing media P housed in the paper cassette 20 at operation S10. The emitted light beam is reflected from one side of the stack of the printing media P, and then scanned by the scanning unit 40 at operation S20.

Figure 7:
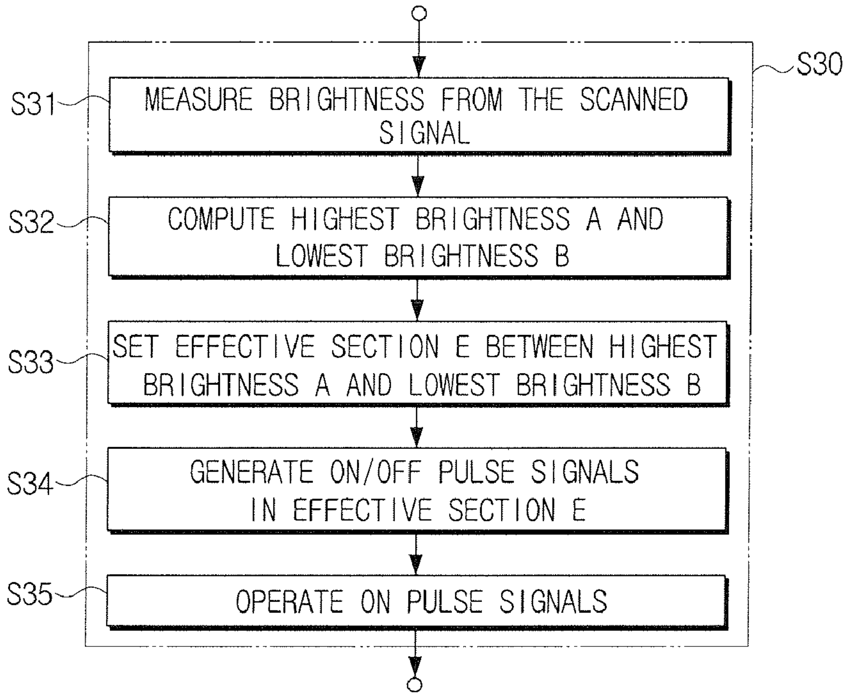
FIG. 7 is a detailed flowchart illustrating the operation to compute the number of sheets of the printing media of FIG. 6.

As shown in FIGS. 5A and 5B, the computing unit 50 computes a number of sheets of the printing media P based on the brightness of one side of the stack of the printing media P scanned by the scanning unit 40 at operation S30. Specifically, as shown in FIGS. 5B and 7, the computing unit 50 measures the brightness from the signal scanned and generated by the scanning unit 40 in a perpendicular direction Y to the grain direction X, that is, the direction in which the printing media P are stacked, at operation S31.

The highest brightness A indicating the relatively brightest region and the lowest brightness B indicating the relatively darkest region are computed based on the measured brightness at operation S32. An effective section E is set between points C and D, which are placed between the highest brightness A and the lowest brightness B at operation S33. The points C and D respectively correspond to approximately 80% and 50% above the lowest brightness B, as described above. However, it is understood that the points C and D may correspond to other percentages as well.

Subsequently, the pulse generator 51 generates ON pulse signals at the relatively bright point C and generates OFF pulse signals at the relatively dark point D in the effective section E at operation S34.

The computing unit 50 uses the number of ON pulse signals transmitted from the generated ON/OFF pulse signals to compute the number of sheets of the printing media P at operation S35.

If a user inputs an image forming signal at operation S40, the indicating unit 60 transmits information about the number of sheets of the printing media P to a user at operation S45. For example, in a situation in which approximately 50 sheets of the printing media P remain in the paper cassette 20, if one user from among a plurality of users using a single image forming apparatus through a network inputs an image forming signal corresponding to 100 sheets, the indicating unit 60 informs the user through a personal computer (PC) that the number of sheets of the printing media P stored in the paper cassette 20 is insufficient to complete the image forming operation. Accordingly, the user can refill 50 or more sheets of the printing media P in the paper cassette 20 in advance.

In an embodiment of the present invention, the computing unit 50 sets an effective section E based on the scanned and generated signal, and computes the number of sheets of the printing media P using the ON and OFF pulse signals at the top and bottom of the section E. However, other aspects of the present invention are not necessarily limited thereto. For example, the ON and OFF pulse signals may be generated to compute the information about the number of sheets of the printing media P without separately setting the effective section E, or the number of sheets of the printing media P may be computed based only on the difference in the brightness. It is understood by one skilled in the art that the brightness measured by the scanning unit 40 can be used in a variety of different ways to calculate the number of sheets of the printing media P.

As described above, according to the embodiments of the present invention, the information on the number of sheets of the printing media P remaining in the paper cassette 20 may be accurately detected to inform the user of the information when the user inputs the image forming signal. Therefore, aspects of the present invention prevent the image forming operation from being suspended due to an insufficient number of sheets of the printing media P housed in the paper cassette P before the image forming operation is completed. In other words, aspects of the present invention prevent a delay of the image forming operation in advance, thus enhancing the operation efficiency of image forming operations.

Additionally, the number of sheets of the printing media P may be computed using the pulse signals in the effective section E set between the highest and lowest brightness, and therefore, the number of sheets of the printing media P can be computed with accuracy.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A printing medium detecting device of an image forming apparatus, the device comprising:
- a light source to emit a light beam to a full height of one side of a stack of printing media housed in a paper cassette;
- a scanning unit to scan the light beam reflected from the stack and generate a signal based on the light beam; and
- a computing unit to compute information related to the stack based on the signal, wherein the information comprises a number of printing media sheets in the stack.

2. The device according to claim 1, further comprising an indicating unit to transmit the information based on a result of the computation.

3. The device according to claim 1, wherein the computing unit computes the number of printing media sheets in the stack by determining a difference in a brightness of the light beam scanned by the scanning unit.

4. The device according to claim 3, wherein the computing unit computes the information based on the difference in the brightness of the signal in a perpendicular direction to a direction in which the sheets of the printing media are stacked.

5. The device according to claim 4, wherein the computing unit sets an effective section between two points of the signal, which are placed between a highest brightness indicating a brightest region and a lowest brightness indicating a darkest region, to compute the information.

6. The device according to claim 5, wherein the computing unit further comprises a pulse generator to generate ON and OFF pulse signals according to the brightness in the effective section.

7. The device according to claim 6, wherein the pulse generator generates one of the ON pulse signals at each relatively bright point corresponding to each of the brightnesses crossing a top of the effective section, and generates one of the OFF pulse signals at each relatively dark point corresponding to each of the brightnesses crossing a bottom of the effective section.

8. The device according to claim 7, wherein the computing unit computes the information according to a number of the ON pulse signals generated by the pulse generator.

9. The device according to claim 5, wherein one of the two points is 80% above the lowest brightness and the other of the two points is 50% above the lowest brightness so that the effective section occupies approximately 50% to 80% above the lowest brightness.

10. The device according to claim 2, wherein the indicating unit transmits the information if an image forming signal is input to the image forming apparatus.

11. The device according to claim 1, wherein the light source and the scanning unit are mounted outside of the paper cassette, and the light beam is emitted to and reflected from the stack of printing media through a guide hole in the paper cassette.

12. The device according to claim 1, wherein the light source and the scanning unit are disposed within the paper cassette.

13. The device according to claim 3, wherein the indicating unit calculates a number of sheets required to perform each of a plurality of image forming operations inputted by a plurality of users through a network and transmits the information to each of the plurality of users according to whether the number of sheets in the stack of printing media is sufficient to perform all of the image forming operations.

14. An image forming apparatus comprising:

a main body in which an image forming unit is mounted;

a paper cassette which is attachable and detachable to and from the main body and holds a stack of printing media; and a printing medium detecting device, comprising:

a light source to emit a light beam to a full height of one side of the stack;

a scanning unit to scan the light beam reflected from the stack and generate a signal based on the light beam; and a computing unit to compute information related to the stack based on the signal, wherein the information comprises a number of printing media sheets in the stack.

15. The apparatus according to claim 14, wherein the computing unit computes the information based on a difference in a brightness of the signal in a perpendicular direction to a direction in which the sheets of the printing media are stacked.

16. The apparatus according to claim 15, wherein the computing unit sets an effective section between two points in the signal, which are placed between a highest brightness indicating a brightest region and a lowest brightness indicating a darkest region, to compute the information.

17. The apparatus according to claim 16, wherein the computing unit further comprises a pulse generator to generate an ON pulse signal at each relatively bright point corresponding to each of the brightnesses crossing a top of the effective section, and generates an OFF pulse signal at each relatively dark point corresponding to each of the brightnesses crossing a bottom of the effective section.

18. The apparatus according to claim 17, wherein one of the two points is 80% above the lowest brightness and the other of the two points is 50% above the lowest brightness so that the effective section occupies approximately 50% to 80% above the lowest brightness.

19. The apparatus according to claim 14, further comprising an indicating unit to transmit the information to a user if an image forming signal is input to the image forming apparatus.

20. The apparatus according to claim 19, wherein the indicating unit calculates a number of sheets required to perform each of a plurality of image forming operations inputted by a plurality of users through a network and transmits the information to each of the plurality of users according to whether a number of printing media sheets in the stack is sufficient to perform all of the image forming operations.

21. A method to detect printing media in an image forming apparatus, the method comprising:

emitting a light beam to a full height of one side of a stack of printing media housed in a paper cassette;

scanning the light beam reflected from the printing media to obtain a signal; and computing information related to the stack based on the signal obtained by the scanning, wherein the information comprises a number of printing media sheets in the stack.

22. The method according to claim 21, wherein the computing comprises:

measuring brightness from the signal;

setting an effective section between two points in the signal, which are placed between a highest brightness indicating a brightest region and a lowest brightness indicating a darkest region;

generating ON and OFF pulse signals according to the brightness in the effective section; and computing the information based on the generated pulse signals.

23. The method according to claim 22, wherein the generating comprises generating one of the ON pulse signals at each relatively bright point corresponding to one of the brightnesses crossing a top of the effective section, and generating one of the OFF pulse signals at each relatively dark point corresponding to one of the brightnesses crossing a bottom of the effective section.

24. The method according to claim 22, wherein the computing comprises computing the information according to a number of the generated ON pulse signals.

25. The method according to claim 22, wherein one of the two points is 80% above the lowest brightness and the other of the two points is 50% above the lowest brightness so that the effective section occupies approximately 50% to 80% above the lowest brightness.

26. The method according to claim 21, further comprising transmitting the computed information to a user if an image forming signal is input.

* * * * *